Patented Feb. 7, 1933

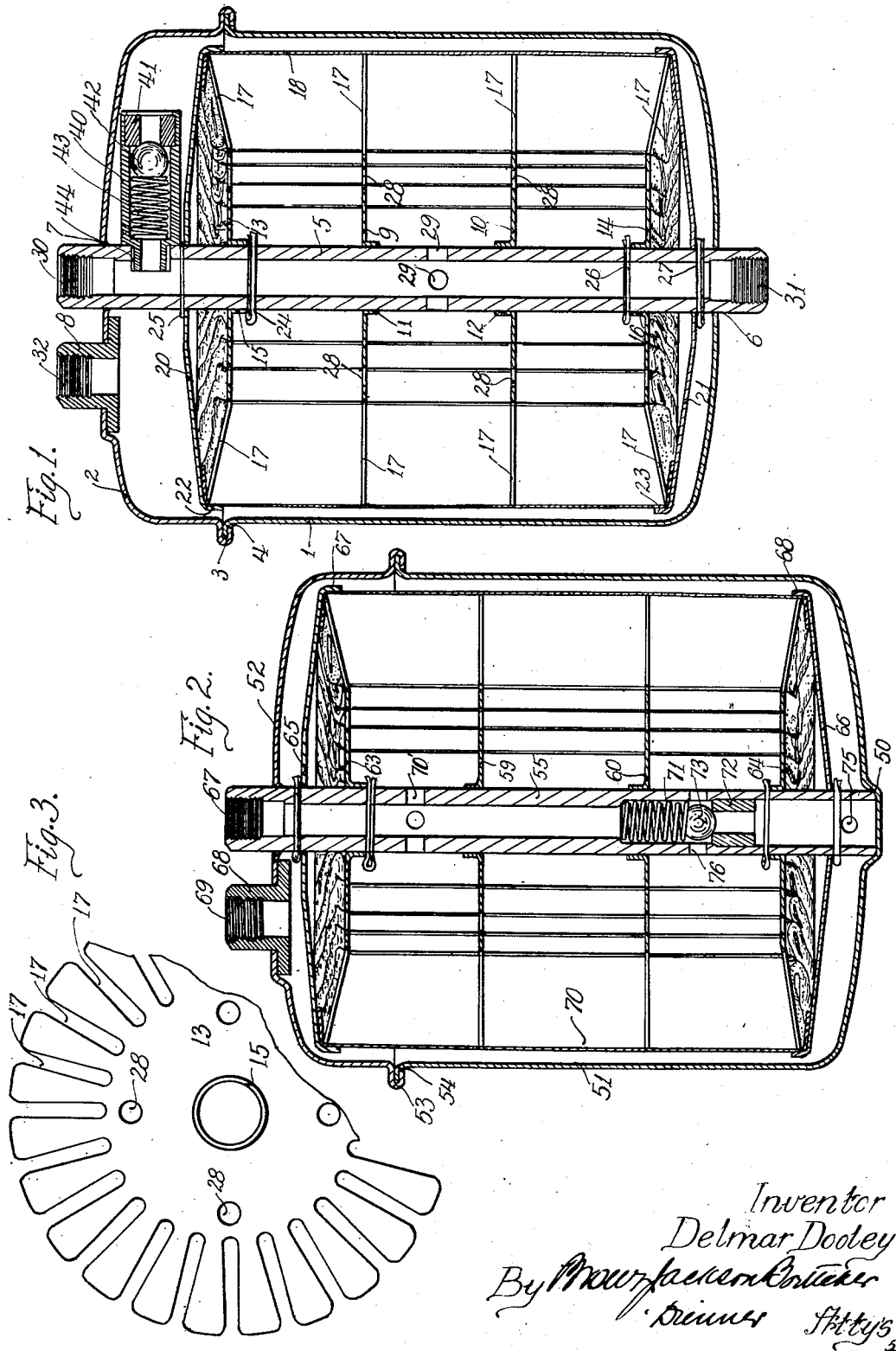

1,896,395

UNITED STATES PATENT OFFICE

DELMAR D. DOOLEY, OF ROCK ISLAND, ILLINOIS, ASSIGNOR TO DOOLEY IMPROVEMENTS, INC., OF ROCK ISLAND, ILLINOIS, A CORPORATION OF ILLINOIS

FILTER

Application filed June 5, 1930. Serial No. 459,318.

This invention relates to filters, more particularly to filters of the discardable type.

In my co-pending application, Serial No. 449,835, filed May 5, 1930, I disclose an oil filter of the discardable cartridge type in which a filter member is supported upon a suitable spider and encased in a hermetically sealed casing. Oil admitted to the casing flows over a cooling member prior to its engagement with the filter fabric, flowing through that fabric and out of a discharge or outlet pipe which communicates with the interior of the fabric member.

My present invention is broadly an improvement upon a filter of this particular type, although the improvements are not limited to filters of this specific type.

As an oil filter is used continuously the fabric constituting the filter member of it becomes coated and clogged with dirt and sediment that is strained out of the oil. Oftentimes this coating of dirt on the fabric becomes so thick that it is difficult to get any oil through the fabric, particularly is this true if the cartridge is not discarded promptly upon the expiration of its rated life. Under these circumstances, the supply of oil discharged from the filter through the outlet pipe thereof is greatly diminished, if not completely cut off, with the result that the device to which the oil is conducted does not receive the expected supply of oil. If the filter is used on an automobile engine, for example, and this supply of oil is materially reduced or entirely cut off, the bearings of the engine are sure to be damaged due to the failure of the oil supply to them.

In my present invention, I have provided a filter which guards against this contingency. I have incorporated within the filter structure a by-pass valve which when open admits oil from the inlet chamber of the filter to the outlet chamber thereof independently of the filter member. Normally this valve is maintained closed in any convenient manner such as by a spring, the tension of which is sufficient to prevent its being opened by the normal pressure difference between the one side of the filter member and the other side. When the filter fabric becomes blocked with dirt, this pressure difference increases sufficiently to cause the by-pass valve to be opened, thereby permitting a flow of unfiltered oil from the inlet of the filter to its outlet. In most instances, particularly in an automobile engine, it is preferable to have a supply of unfiltered oil available for the engine than to have no supply of oil available to it.

In my above mentioned co-pending application I disclose a filter framework consisting of a plurality of discs supported on a suitable pipe, these discs being slotted to form channels into which the filter fabric member is fluted to thereby increase its effective area without materially increasing its overall dimensions. The filter fabric overlaps the frame and the overlapped portion is wadded in between the end one of the discs and an auxiliary disc forced down over the end of the pipe. This latter disc is provided with a flange which engages the peripheral edge of the slotted disc and is rolled over that edge to lock the fabric in place on the framework.

This construction, while it is eminently satisfactory, is expensive, and I have therefore, as a further object of my invention, provided a new and improved method of securely attaching the fabric to the framework, a method which permits a material reduction in the cost of manufacture of a filteer of this type.

Now, to acquaint those skilled in the art with the teachings of my invention, reference is made to the accompanying drawing in which a preferred embodiment of it is shown by way of example, and in which:

Figure 1 is a cross-sectional elevational view of a completely assembled filter;

Figure 2 is a cross-sectional elevational view through a slightly modified form of filter;

Figure 3 is a fragmentary plan view of the spider employed in the filter shown in Figures 1 and 2.

Referring to the drawing now, in more detail, the filter comprises a casing member 1 and cover 2 which are joined together by a standing seam 3 which is soldered or welded at 4 to hermetically seal the casing. A pipe 5 projects through a central opening in the bottom of the casing 1 and through a corresponding opening in the cover 2, this pipe being soldered to the casing at 6 and to the cover at 7 to form an air tight connection with these members.

An inlet port or bushing 8 is fitted into the cover adjacent the projecting end of the pipe 5, this bushing likewise being soldered or welded into the cover to form a tight joint therewith.

Within the casing, are a plurality of flat slotted discs 9 and 10 having circular flanges 11 and 12, respectively, which embrace the surface of the pipe 5 to support the discs thereon, these discs being pressed over the pipe and held solely by friction between their flanges and the surface of the pipe. The pipe 5 also carries dished discs 13 and 14 located on the outside of the discs 9 and 10, with their concave sides facing outwardly toward the end of the cylinder which they form. The discs 13 and 14 likewise contain circular flanges 15 and 16, respectively, which embrace the pipe 5 to hold the discs thereon.

The discs 9, 10, 13 and 14 are each provided with a plurality of slots disposed in their peripheral edge and extending radially inward, these slots forming a plurality of fins radially disposed around the outer edge of the disc. The end discs 13 and 14 are shaped so that these fins are bent out of the plane of the central portion of the disc, forming the member into a frusto conical shape.

The discs 9, 10, 13 and 14 are placed on the pipe 5 so that the slots 17 in their respective peripheries are aligned longitudinally of the cylinder thereby forming slots into which a fabric member 18 is fluted.

The fabric member 18 is wider than the distance between the end discs 13 and 14, the excess part of the fabric is folded over these end discs into their concave surfaces.

The pipe 5 also carries cooling and sealing discs 20 and 21 which are provided with flanges 22 and 23, respectively, these flanges overhanging the peripheral edge of the end discs 13 and 14, over which edge the fabric 18 is bent. The discs 20 and 21 are likewise dished and are disposed upon the pipe 5 with their concave surfaces adjacent to the concave surfaces of the end discs 13 and 14, respectively. The two discs therefore form a cavity or chamber between them, in which cavity or chamber the excess fabric of the filter member 18 is folded or wadded, the solid discs 20 and 21 preventing the entrance of oil into the interior of the cylinder formed by this filter member through its ends, and the folded and wadded ends of the fluted fabric sealing the ends of the flutes to prevent the flow of oil through the flutes into the space between the end discs 20—21 and the slotted spring discs 13—14.

The cupping of the discs 20—21 is not essential, as this cupping is done mainly for the sake of strength with minimum material.

The slotted spring discs 13—14, which cooperate with the end discs 20—21 are cupped for the primary purpose of providing an expansible member cooperating with the flanges 22—23 to form a tight peripheral grip upon the fabric 18. It may be seen that by pressing upon the disc 20, for example, the outer ends of the fingers formed by the slots 17—17 in disc 13 will be straightened out and the outer ends thrown radially outwardly from the pipe 5, thereby virtually expanding the diameter of the said disc 13. Another function of the cupped discs 13—14 is to provide a space within which the folded ends of the flutes of the fabric may be disposed and wadded together, so tightly as to close the flutes against the free entrance of oil into the interior of the filter. In the present design part of the space required for the folded ends of the fluted fabric is provided by cupping the end discs 20—21.

In order to securely bind the fabric 18 between the peripheral edge of the spider 13 and the disc 20, I have provided a cotter pin 24 which extends through the pipe 5 at the inner edge of the flange 15 of the spider 13. A similar cotter pin 25 extends through the pipe 5 on the outer surface of the disc 20. In order to position the disc and spider so that the cotter pins may be inserted, pressure must be exerted on the disc longitudinally of the axis of the pipe 5, this pressure causing the disc 20 to bear against the outer ends of the fins of the spider 13 along the peripheral edge of that spider. This pressure tends to flatten the spider, that is, to move the outer ends of the fins into the plane of the central portion of the spider, this movement increasing the perimeter of the peripheral edge of the spider. This movement also moves the peripheral edge of the spider firmly against the flange 22 and the disc 20, binding the fabric 18 between the peripheral edge of the spider and that flange. The hoop strength of the flange 22 resists the pressure thus placed on it and the fins therefore form struts bearing against this hoop, thus securely binding the fabric against movement in all directions. This binding alone is sufficient to securely hold the fabric upon the framework and also to prevent oil creeping into the interior of the cylinder formed by the fabric without passing through that fabric. It will be noted, that in the instant invention, the flange 22 need not be rolled over or crimped over the edge of the end spider, since the tension placed upon it by the spider is sufficient to securely bind the fabric therebetween. The cotter pin 25, projecting through suitable openings in the pipe, holds the disc 20 firmly in position to maintain the pressure between the spider and the flange 22.

Similarly, the spider 14 is locked on the pipe by a pin such as the cotter pin 26 engaging this flange 16, and the disc 21 is pressed to move it longitudinally of the pipe 5, thereby bringing the peripheral edge of the disc 14 firmly into engagement with the flange 23 on the disc 21 to bind the fabric 18 therebetween. A cotter pin 27 locks the disc 21 in position on the pipe, thereby assuring that the pressure between the peripheral edge of the spider and the flange will be maintained.

Each of the spiders 9, 10, 13 and 14 are provided with a plurality of holes 28 so that oil which filters through the fabric 18 can flow freely longitudinally of the pipe 5 within the cylinder formed by the fabric. The pipe 5 is provided with ports 29 through which the oil flows to enter the pipe. The ends of the pipe 5 which project through the casing 1 and cover 2 are each threaded preferably internally as shown at 30 and 31, these threads accommodating pipe fittings by which the oil that flows into the pipe through the ports 29 is drained from the filter. In the preferred embodiment of my invention, these pipe ends are threaded for standard ⅛ inch automotive pipe fittings, although obviously, this particular size of thread may be varied within the teachings of my invention. Similarly, the inlet bushing is threaded at 32 with standard ⅛ inch automotive pipe thread to permit attachment of the inlet pipe to it. In certain installations in which the filter shown in Figure 1 may be used, the inlet pipe and the outlet pipe will be led from the same end of the filter casing, and therefore the inlet pipe will be threaded into the threads 32 and the outlet into the threads 30, and the threads 31 in the opposite end of the pipe will receive a plug which blocks that end of the pipe. In certain other installations, the plug may be placed in the threads 30 and the outlet pipe led from the threads 31 at the opposite end of the casing.

In the normal operation of the filter, oil admitted through the port 8 flows over the disc 20 and is cooled prior to its engagement with the filter fabric 18. The cooled oil flows through the fabric into the interior of the cylinder formed by it, through the port 29, and into the pipe 5 from which it is drained through the outlet which may be attached to either the threads 30 or 31 as hereinbefore explained.

As the fabric becomes old it becomes clogged with dirt that it has strained out of the oil passing through it, and consequently the flow of oil through the fabric is restricted. If the filter is not discarded after the normal term of its life has been run, the coating of dirt on the fabric 18 may be sufficiently thick to virtually prevent the flow of oil through the fabric. If the filter is installed in an automobile, and this condition results, the bearings of the engine are sure to be damaged because of a meager and insufficient supply of oil.

To guard against this contingency, I have provided a by-pass valve indicated generally at 40 and consisting of a valve seat 41, a ball valve 42 and a spring 43 all encased within the valve 40. The valve is threaded into an opening 44 in the pipe 5, and located between the disc 20 and the cover 2 of the filter unit.

Normally the pressure in the space between this disc and cover is insufficient to unseat the ball 42 against the tension of the spring 43, and the oil in this space must therefore pass through the filter member 18 to reach the outlet pipe of the filter. However, when the fabric 18 is badly coated with dirt, the pressure on the outside of it, and consequently on the outside of the valve 40, will be increased and the pressure on the inside of the cylinder, and consequently on the inside of the pipe 5, will be decreased, and the differential of pressure between the opposite sides of the ball 42 will be sufficient to move that ball off of the seat 41 against the tension of spring 43. Under these conditions, the oil that flows into the filter through the inlet 8 passes through the opening in the seat 41 and into the pipe 5 through the valve 40 without passing through the fabric 18 so that the supply of oil to the engine can be maintained even though the filter is out of commission. By this arrangement, damage to the bearings of the engine due to an improper oil supply is eliminated. The oil delivered to the engine under these conditions is not filtered.

The placing of the valve 40 between the disc 20 and the cover 2 of the casing necessitates either that the casing be made longer or the cylinder formed by the fabric 18 be made shorter to provide space for this valve. In certain instances, neither of these changes in dimensions is desirable, and I have therefore provided a slightly modified form of filter in which the valve can be installed without either increasing the overall length of the filter or decreasing the effective area of the filter fabric. In Figure 2, I have illustrated this embodiment of my invention.

The casing 51 is similar to the casing 1 except that a pocket 50 is formed in its lower end wall. The cover 52 is identical with the cover 2 and attached to the casing 51 by a standing seam 53 which is soldered or welded at 54. The pipe 55 is located centrally of the casing and cover, projecting through the cover and projecting into the pocket 50. Spiders 59 60 are supported on the pipe 55 by flanges, and dished end spiders 63 and 64 are likewise supported thereon. End discs 65 and 66 having flanges 67 and 68, respectively, are also placed on the pipe 55 and held against the end spider by cotter pins in the hereinbefore explained manner. The end of the pipe 55 projecting through the cover 52 is threaded internally at 67 to receive an outlet pipe by which the oil is carried away from the filter to the device that is to use it. The inlet bushing 68 is located in the cover and threaded at 69 as before.

Normally oil flows through the inlet bushing 68 onto the disc 65 and around the outside edge of the fabric 70 through that fabric into the cylinder formed in it and through the ports 70' into the pipe 55 from which it flows through the outlet pipe that is connected to the threads 67.

The valve 71 is located inside of the pipe 55 and consists of a seat 72, a ball 73 and a spring 74, the tension of the spring being sufficient to keep the ball 73 on the seat 72 during the normal operation of the filter. Oil admitted to the inlet port 68 and around the outside of the cylinder formed by the filter fabric 70 is admitted into the bottom end of the pipe through a plurality of ports 75, where normally it is blocked by the valve 73. When the pressure on the outside of the filter cylinder becomes sufficiently high to unseat the valve 73, oil in the bottom end of the pipe 55 flows through the opening in the valve seat 72 and then outward through the port 76 into the interior of the cylinder formed by the filter fabric. This oil reenters the pipe through the ports 70' and flows out of the filter through the outlet in the usual manner. A part of the oil that passes through the valve 71 may flow directly upward through the pipe 55, this oil supplementing the oil that flows through the ports 76.

The arrangement shown in Figure 2 is advantageous in that the overall dimensions of the filter are not changed nor are the dimensions of the effective area of the filter fabric changed by the insertion of the release valve in the filter. In this embodiment of my invention, the oil inlet pipe and the oil outlet pipe must always be led from the same end of the filter casing.

From the foregoing, it will be apparent that I have provided a new and improved filter which can be economically manufactured and which guards against the possibility of damage to the engine with which it is used due to the filter fabric becoming so clogged that oil cannot pass through it. While I have chosen to show a preferred embodiment of my invention, I have done so by way of example only, as there are many modifications and adaptations which can be made by one skilled in the art without departing from the teachings of my invention.

Having thus complied with the statutes and shown and described a preferred embodiment of my invention, what I consider new and desire to have protected by Letters Patent is pointed out in the appended claims.

What is claimed is:

1. In an oil filter, a pipe, a slotted cupped disc fastened thereon, a fabric fluted into the slots in said disc and folded within its cupped portion to seal off the ends of the flutes, a second cupped disc disposed on said pipe with its concave face adjacent the concave face of the slotted disc, a flange on said second disc against which the peripheral edge of said first disc binds said fabric, and means for holding said discs together under tension, said tension tending to flatten said first cupped disc to thereby securely bind the said fabric to said flange.

2. In an oil filter, a spider containing radial fins formed with slots between them, said fins being bent out of the plane of the spider, a cupped disc disposed with its concave face adjacent the concave face of said spider, a flange on said disc overlapping the peripheral edge of said fins, a fabric disposed between said edge and flange and extending into the space between said concave faces, and means for holding said disc and spider together under tension, said means tending to flatten the spider and thereby cause the fins to press against said flange to clamp said fabric firmly therebetween.

3. In an oil filter, a pipe, a slotted cupped disc fastened thereon, a fabric fluted into the slots in said disc and folded within its cupped portion to seal the ends of the flutes, a second disc disposed on said pipe adjacent the concave face of the slotted disc, a flange on said second disc against the peripheral edge of which said first disc binds said fabric, and means for holding said discs together under stress, said stress tending to flatten and expand said cupped disc to thereby securely bind the said fabric to said flange.

4. In an oil filter, a pipe, a substantially circular disc centrally supported on said pipe and disposed transversely thereto, said disc having slots extending inwardly from the edge and being dished to form a concave supporting bracket, a second bracket member mounted on said pipe on the convex side of said first bracket member, a filter member mounted on said brackets and being fluted into the said slots and terminated within the concave portion of said first bracket to seal off the end of the flute, a flanged head pressed over one end of the pipe and bearing against said first named bracket to bind the filter member by flattening out the concave supporting bracket, and means for holding said head in place on said pipe.

5. In a filter, a central rod, a pair of outwardly dished resilient metal brackets mounted on the rod adjacent opposite ends thereof, said brackets having slots defining flexible fingers, a filter fabric extending between and surrounding said brackets and having its ends extending beyond the brackets, head members having flanges embracing the periphery of the brackets, said head members bearing endwise against the brackets to cause the spring fingers thereof to swing outwardly from the rod and to grip the filter fabric between said fingers and the flanges of the heads, and means holding the head members endwise against the reaction of the bracket.

6. In a filter, a casing, a central rod having a portion thereof disposed within the casing, a generally cylindrical filter member formed of fabric, and means for supporting one end of said filter member on and substantially coaxially with said rod, said means comprising a bracket secured on the rod near one end thereof, the said bracket having radial fingers extending diagonally outward toward the adjacent end of the rod, a head member having a flange adapted to telescope with respect to said bracket, said head pressing the fingers endwise of the rod and causing them to thrust the fabric against the inside of the flange, means causing the said head member to bear endwise against the filter supporting bracket to cause said spring fingers to grip the filter element, a head for closing the other end of the filter member, and means cooperating with said last named head for holding said latter end of the filter member.

In witness whereof, I hereunto subscribe my name this 29th day of May, 1930.

DELMAR D. DOOLEY.